(12) United States Patent
Fittro et al.

(10) Patent No.: US 8,932,163 B2
(45) Date of Patent: Jan. 13, 2015

(54) BELT TENSIONING DEVICE WITH VARIABLE SPRING FACTOR

(75) Inventors: Zachary Lee Fittro, Rogers, AR (US); Carter Ray Serage, Grove, OK (US); David Mathias Bednar, Jr., Jonesboro, AR (US)

(73) Assignee: Dayco IP Holdings, LLC, Springfield, MO (US)

( * ) Notice: Subject to any disclaimer, the term of this patent is extended or adjusted under 35 U.S.C. 154(b) by 417 days.

(21) Appl. No.: 13/400,447

(22) Filed: Feb. 20, 2012

(65) Prior Publication Data

US 2013/0217526 A1 Aug. 22, 2013

(51) Int. Cl.
*F16H 7/12* (2006.01)

(52) U.S. Cl.
USPC .......................................................... 474/135

(58) Field of Classification Search
CPC F16H 2007/081; F16H 7/1281; F16H 7/1218
USPC ................................................. 474/135, 138
See application file for complete search history.

(56) References Cited

U.S. PATENT DOCUMENTS

| | | |
|---|---|---|
| 4,101,015 A | 7/1978 | Radke |
| 4,473,362 A | 9/1984 | Thomey et al. |
| 4,971,589 A | 11/1990 | Sidwell et al. |
| 4,976,661 A * | 12/1990 | Ojima ............................ 474/138 |
| 5,083,984 A | 1/1992 | Quintus et al. |
| 5,632,697 A | 5/1997 | Serkh |
| 5,803,849 A * | 9/1998 | Ayukawa ......................... 474/94 |
| 6,053,831 A | 4/2000 | Boedo |
| 6,264,578 B1 * | 7/2001 | Ayukawa ....................... 474/135 |
| 7,090,606 B2 | 8/2006 | Dec |
| 7,887,445 B2 * | 2/2011 | Quintus et al. ................ 474/135 |
| 8,267,819 B2 * | 9/2012 | Lehtovaara et al. .......... 474/109 |
| 8,617,013 B2 * | 12/2013 | Ferguson et al. ............. 474/135 |
| 2007/0249446 A1 | 10/2007 | Hao et al. |
| 2010/0137084 A1 * | 6/2010 | Mevissen et al. ............. 474/135 |
| 2011/0015015 A1 | 1/2011 | Gresley |
| 2011/0105261 A1 | 5/2011 | Hodjat |
| 2013/0217526 A1 | 8/2013 | Fittro et al. |

OTHER PUBLICATIONS

International Search Report and Written Opinion, PCT/US2013/026567 (May 3, 2013).

* cited by examiner

*Primary Examiner* — William E Dondero
*Assistant Examiner* — Mark K Buse
(74) *Attorney, Agent, or Firm* — Thompson Hine L.L.P.

(57) ABSTRACT

A tensioning system including a base and an arm pivotally coupled to the base, the arm having an engagement surface thereon. The system further includes a biasing mechanism operatively coupled to the arm to bias the arm relative to the base. The biasing mechanism includes a coil spring having a plurality of coils, at least some of the coils or parts thereof being configured to switch between an activated state and deactivated state based upon a position of the arm relative to the base.

21 Claims, 10 Drawing Sheets ent surface thereon. The system further includes a biasing mechanism operatively coupled to the arm to bias the arm relative to the base. The biasing mechanism includes a coil spring having a plurality of coils, at least some of the coils or parts thereof being configured to switch between an activated state and deactivated state based upon a position of the arm relative to the base.
BELT TENSIONING DEVICE WITH VARIABLE SPRING FACTOR The present invention is directed to a belt tensioning device, and more particularly, to a belt tensioning device having a variable spring factor.

BACKGROUND

Belt tensioners are utilized to ensure the associated belt, such as a belt in an automotive vehicle, is placed and maintained in tension. The tensioner may be desired to be maintained in its nominal position which places the belt in the desired state of tension. The tensioner may incorporate a spring element that urges the tensioner to the nominal position under normal operating conditions. In many existing tensioning device the spring force applied to the tensioner may be relatively high when the tensioner is initially mounted in the nominal position to account for torque decay. However, such relatively high tension can cause degradation of components in the system, and also adversely effect fuel efficiency.

SUMMARY

In one embodiment, the present invention is a belt tensioning device having a variable spring factor which can address the effects of torque decay. In particular, in one embodiment the invention is a tensioning system including a base and an arm pivotally coupled to the base, the arm having an engagement surface thereon. The system further includes a biasing mechanism operatively coupled to the arm to bias the arm relative to the base. The biasing mechanism includes a coil spring having a plurality of coils, at least some of the coils or parts thereof being configured to switch between an activated state and deactivated state based upon a position of the arm relative to the base.

DETAILED DESCRIPTION

Figure 1:
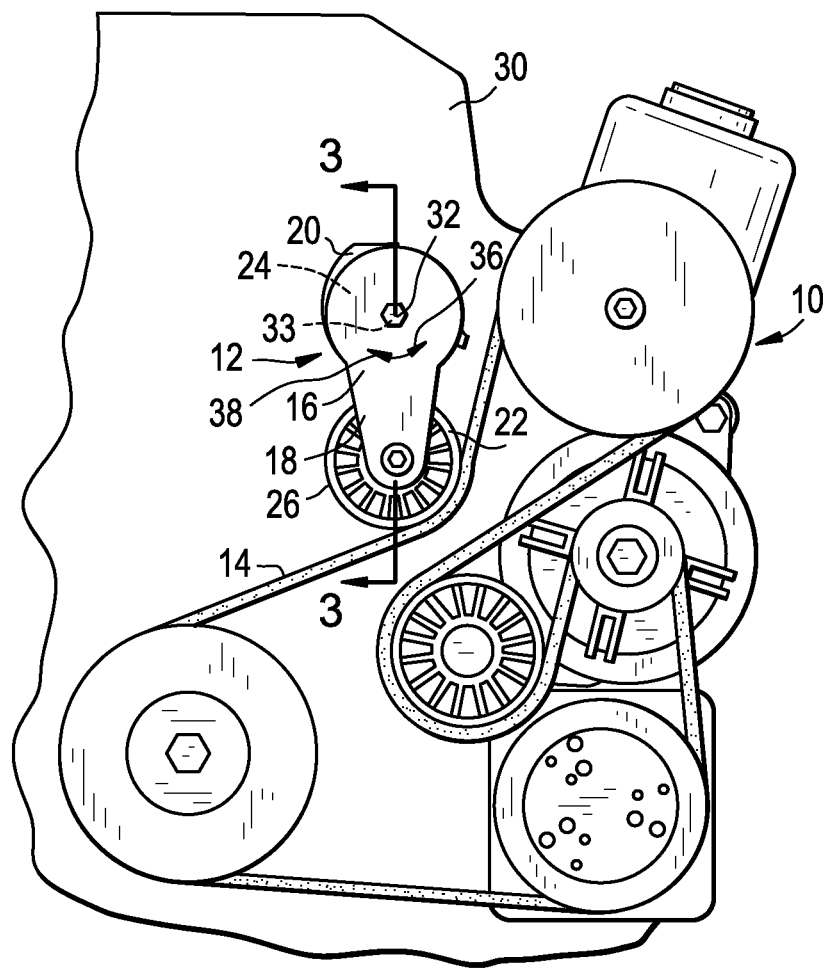
FIG. 1 is a front view of a belt system utilizing a tensioner, shown in its nominal position.

FIG. 1 is a front view of a belt system, generally designed 10, shown in association with a belt tensioner 12. The belt system 10 includes an endless power transmitting element 14, such as a belt, chain or the like, which passes around a variety of pulleys, gears, guides. The power transmitting element 14 thereby drives a plurality of driven accessories, and/or is driven by one or more of the components. The power transmitting element 14 can, in one case, take the form of a timing belt/chain, a drive belt/chain, a transmission belt/chain or the like for use in an automotive vehicle. The tensioner 12 engages the power transmitting element 14 to apply the desired force to the power transmitting element 14 and to induce the desired tension.

Figure 2:
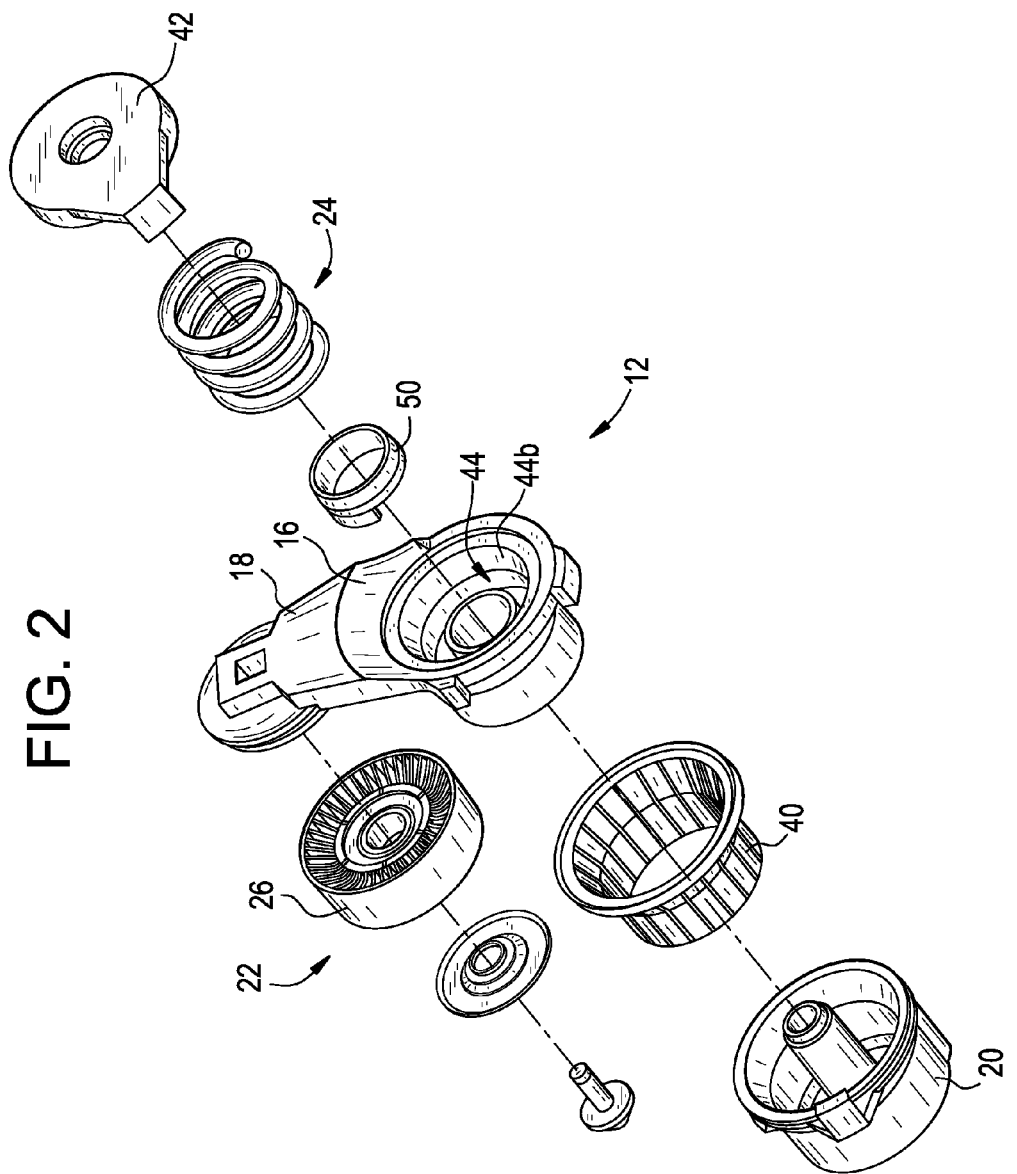
FIG. 2 is an exploded view of the tensioner of FIG. 1.
Figure 3:
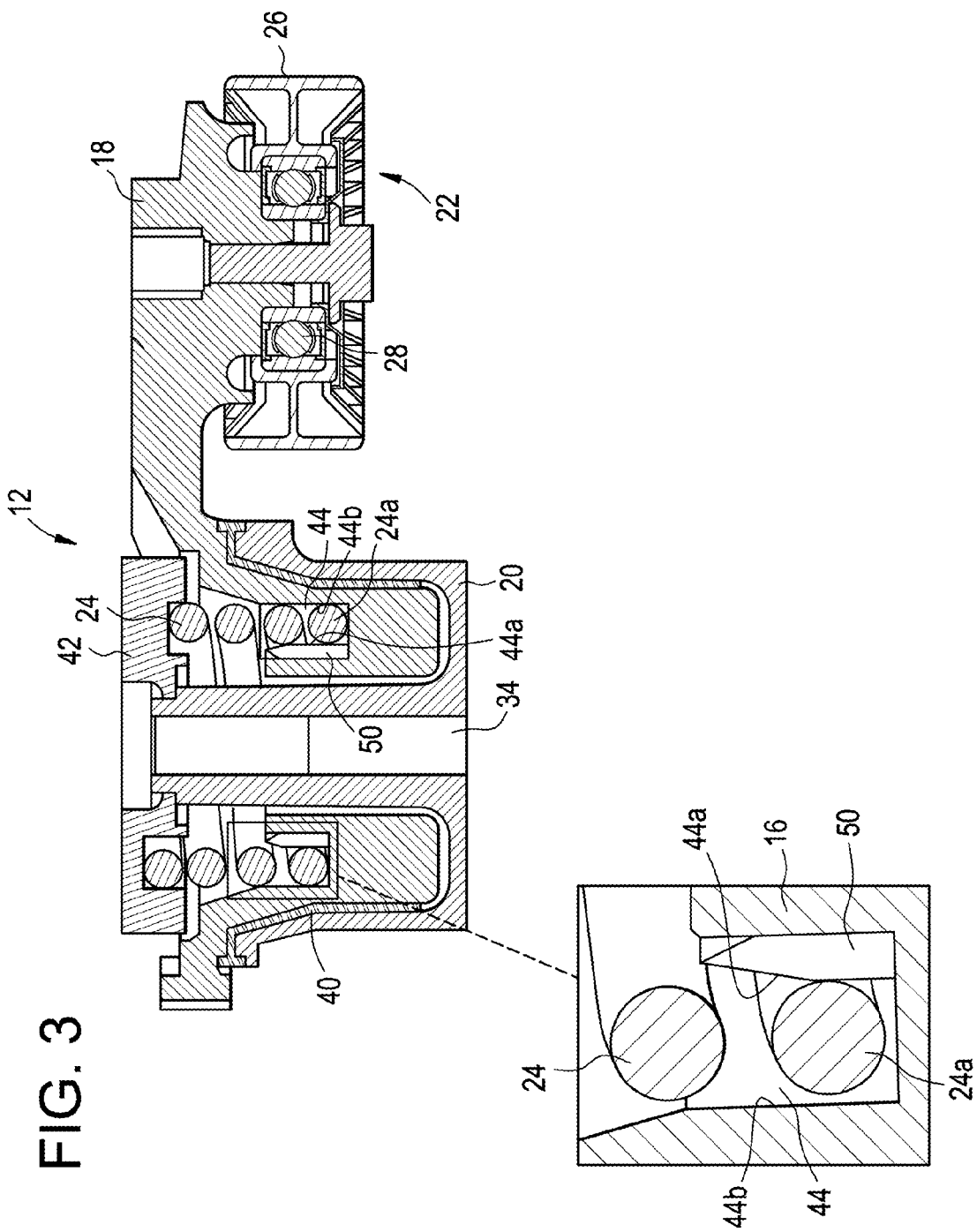
FIG. 3 is a side cross section of the tensioner of FIG. 1, taken along line 3-3, showing the tensioner in its free arm position.

With reference to FIGS. 1-3, the tensioner 12 includes an arm 18 movably coupled to a spring case or base 20. The tensioner 12 further includes a belt engagement surface 22 positioned at one end of the arm 18, and a biasing mechanism or energy storing device 24 positioned between and operatively engaging, the arm 18 and spring case 20. In one embodiment, the belt engagement surface 22 takes the form of a generally cylindrical roller 26 rotatably coupled to the arm 18 via a bearing 28, as shown in FIG. 3, such that the roller 26 can rotate as the belt 14 rolls past the tensioner 12. Alternately the belt engagement surface 22 can take the form of a smooth, but non-rotatable, component with high-lubricity, or a toothed sprocket (for use with a chain), etc.

The arm 18 is pivotally coupled to the spring case 20, and the spring case 20 is configured to be fixedly and non-rotatably coupled to an anchor body 30, such as an engine, engine block, engine cover, frame, etc. In one embodiment the tensioner 12/spring case 20 is generally coupled to the anchor body 30 by a threaded fastener 32, such as a bolt, extending through a central opening 34 of the tensioner 12 and into the anchor body 30. The bolt 32 thereby defines, or is aligned with, an axis about which the arm 18 is pivotable. The tensioner 12 could also be mounted in various other configurations and manners, such as in a tab/ear mounting configuration.

The biasing mechanism 24 can take the form of a spring, such as a helical coil spring in the illustrated embodiment. The biasing mechanism 24 urges the arm 18/roller 26 into contact with the belt 14 with the desired amount of force, and allows the arm 18 to pivot about the axis (i.e. in the direction of the arrows 36, 38 shown in FIG. 1) to accommodate varying forces applied to the arm 18/roller 26 by the belt 14. A bushing 40 is positioned between the arm 18 and the spring case 20 and a spring cover 42 is located at one axial end of the spring 24 to cover and protect the spring 24.

The tensioner 12 may have or be able to assume a nominal position, as shown in FIG. 1, wherein the arm 18/engagement surface 22 engages and induces the desired tension in the belt 14. The tensioner 12 may also have or be able to assume a free arm position, which is the position the tensioner 12 assumes in the absence of any outside forces (i.e. when the tensioner 12 is moved out of engagement with the belt 14). In the embodiment of FIG. 1, then, the arm 18 would move in the direction of arrow 36 to assume the free arm position. The tensioner 12 may have a stop which the arm 18 engages when the tensioner 12 is in its free arm position such that some spring force is applied to the arm 18 when the tensioner 12 is in its free arm position.

The tensioner 12 may also have or be able to assume an install position, which is a position the arm 18 assumes in order to enable installation of the tensioner 12/belt 14. In particular, when the tensioner 12 is in the install position, the arm 18/engagement surface 22 is moved out of contact with the belt 14, and the arm 18 would move in the direction of arrow 38 of FIG. 1 to assume the install position. The tensioner 12 may have a stop which the arm 18 engages when the tensioner 12 is in its install position to limit movement of the arm 18 past the install position.

The actual radial positions assumed by the tensioner 12 when the tensioner 12 is in the free arm, nominal, and install position can vary as desired. However, in one particular case used for illustration herein, when the tensioner 12 is in its free arm position the arm 18 is considered to be at the zero degree position; when the tensioner 12 is in its nominal position the arm 18 is pivoted fifteen degrees from the free arm position; and when the tensioner 12 is in its install position the arm 18 is pivoted thirty degrees from the free arm position.

The tensioner 12 may be designed to reside in the nominal position when installed to apply a desired tension to the belt 14. However, over time the belt 14 may stretch, or other components may wear, which can cause the tensioner 12 to shift toward the free arm position. In many existing systems movement of the tensioner 12 towards its free arm position over time reduces the amount of applied torque, which is known as torque decay. Accordingly, in order to accommodate torque decay tensioners 12 may be designed to apply a particular Minimum Required Torque ("MRT") when the tensioner 12 is at or near the free arm position, which is the minimal torque required to avoid slippage of the belt 14 and ensure proper functioning of the belt system 10.

As shown in FIG. 3, in one embodiment the spring 24 is positioned in a spring cavity 44 of the tensioner 12. The cavity 44 is a generally annular space having a radially inner surface 44a and a radially outer surface 44b, although the cavity 44 can assume various other shapes. In one embodiment, the radially inner 44a and/or radially outer 44b surfaces, or at least their bottom portions thereof, are angled with respect to the vertical/central axis. In this manner, both the radially inner 44a and radially outer 44b surfaces may be shaped as a generally conical surface. In one embodiment, both the radially inner 44a and radially outer 44b surfaces are configured such that the narrowest portion of the spring cavity 44 is at the bottom portions thereof, and the spring cavity 44 opens to a wider shape, having a generally "V" shape (although the angle/taper of the cavity 44 may be so slight as to not be visually recognizable).

The spring 24 may be configured such that the spring 24 unwinds when the arm 18 moves in the direction of arrow 38 of FIG. 1. In some existing system, the unwinding of the arm 18 thereby induces an additional spring force. In such systems, greater deflection/pivoting of the arm 18 away from the free arm position in the direction of arrow 38 leads to a greater applied torque, with a generally linear relationship between the two. The spring 24 may also be configured such that as it unwinds, its diameter increases; and as the spring 24 winds up (i.e. moves in the direction of arrow 36) the applied torque decreases and the diameter of the spring 24 decreases. For example, in one case the spring diameter changes at about 0.03 mm per degree of travel of the arm 18.

Many existing tensioners utilize a spring with a constant spring rate k, such that applied torque varies linearly with respect to position of the arm 18. In contrast, the tensioner 12 disclosed herein utilizes a single helical coil spring 24 as the biasing mechanism, and is configured such that the spring 24 provides a variable spring factor k depending upon the position of the arm 18. The tensioner 12 utilizes the varying diameter of the spring 24, in combination with the tapered inner 44a and/or outer 44b surfaces, to provide the variable spring rate.

As shown in FIG. 3, when the tensioner 12 is in its free-arm position, the spring 24 has a relatively small diameter. In particular, at least the bottom-most coil 24a, or part thereof, of the spring 24 interferes with and/or frictionally engages the inner surface 44a. The coil 24a, or portions thereof, engaging the inner surface 44a in this manner are considered to be deactivated since they are locked in place and therefore do not provide a biasing force to the arm 18.

For a helical coil spring made of wire with a circular cross-section, the following equation governs the value for its spring rate:

$$k = d^4 G / 8 D^3 N_a \qquad \text{(Equation 1)}$$

wherein k is the spring rate, d is the wire diameter, G is the modulus of rigidity, D is the mean wire diameter, and $N_a$ is the number of active coils. Accordingly, it can be seen that in the configuration shown in FIG. 3, portions of the spring 24 are deactivated (reducing the number of active coils), which leads to an increased spring factor compared to when all portions of the spring 24 are activated. This concept can be roughly visualized when one considers a beam supported only at its ends, and that it is easier to deflect a relatively long beam at its center compared to a relatively short beam. In this case, then, deactivating coils can be considered to be analogous to shortening the beam. Accordingly, when the tensioner 12 is in its state shown in FIG. 3, the spring 24 has a relatively high spring rate due to the disengaged coil or coil portions 24a at the bottom axial end thereof.

The spring 24 could have other cross-sections besides round (such as a flat cross section), and adjustments to Equation 1 can be made accordingly. Moreover, the spring factor may change when the diameter of the spring 24 changes, however, for Equation 1 above as applied to typical tensioners, such variations of the spring factor are negligible.

Figure 4:
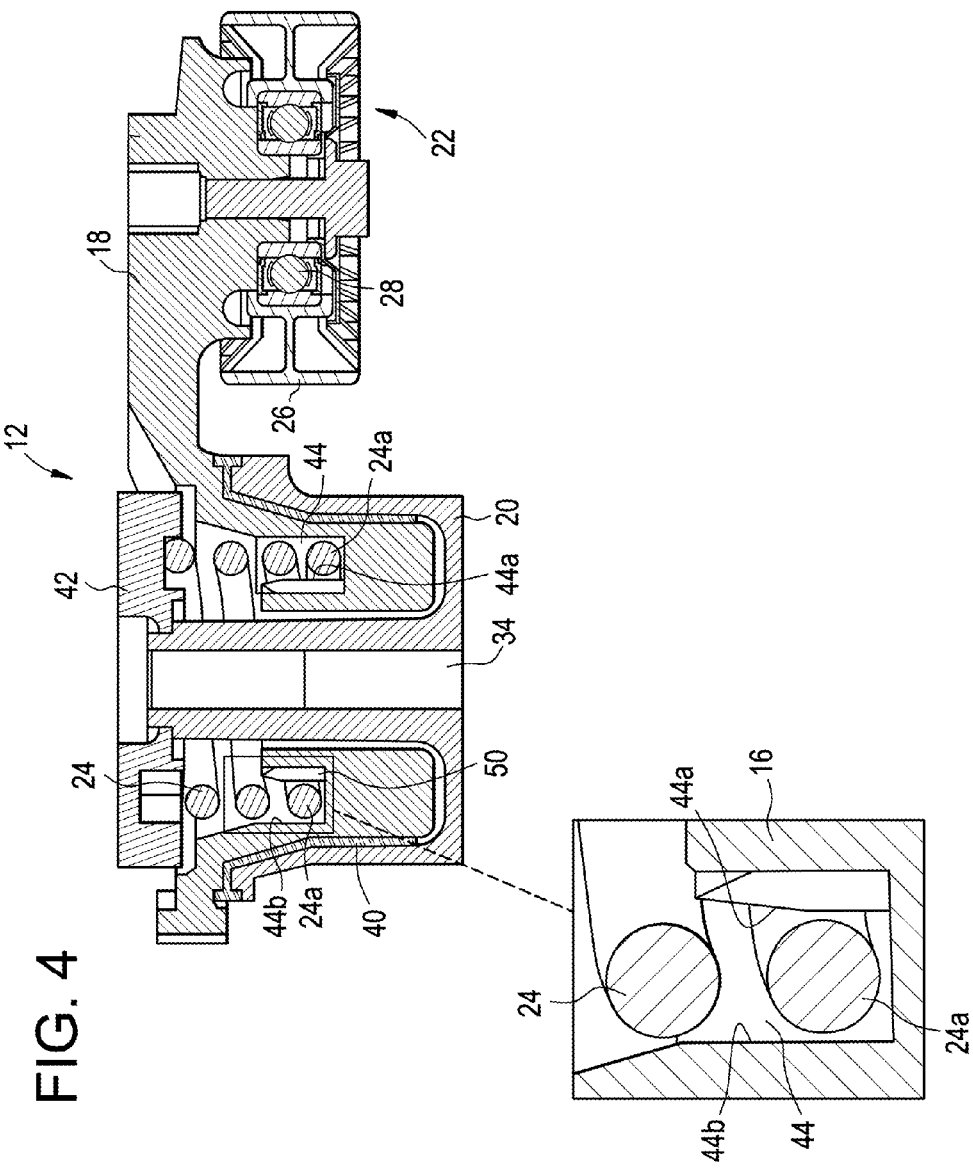
FIG. 4 illustrates the tensioner of FIG. 3 in its nominal position.

When the tensioner 12 moves from the free-arm position (FIG. 3) to the nominal position (FIG. 4) the spring 24 is unwound and increases its diameter. Thus, as can be shown in FIG. 4, the lower portion 24a of the coil 24 is disengaged from the inner surface 44a. Moreover, in the illustrated embodiment the spring 24 is entirely spaced away from, or does not frictionally engage, either the inner 44a or outer 44b surfaces. Thus, in this position, all of the coils of the springs 24 are active, and the spring factor for the spring 24 is at its lowest value.

Figure 5:
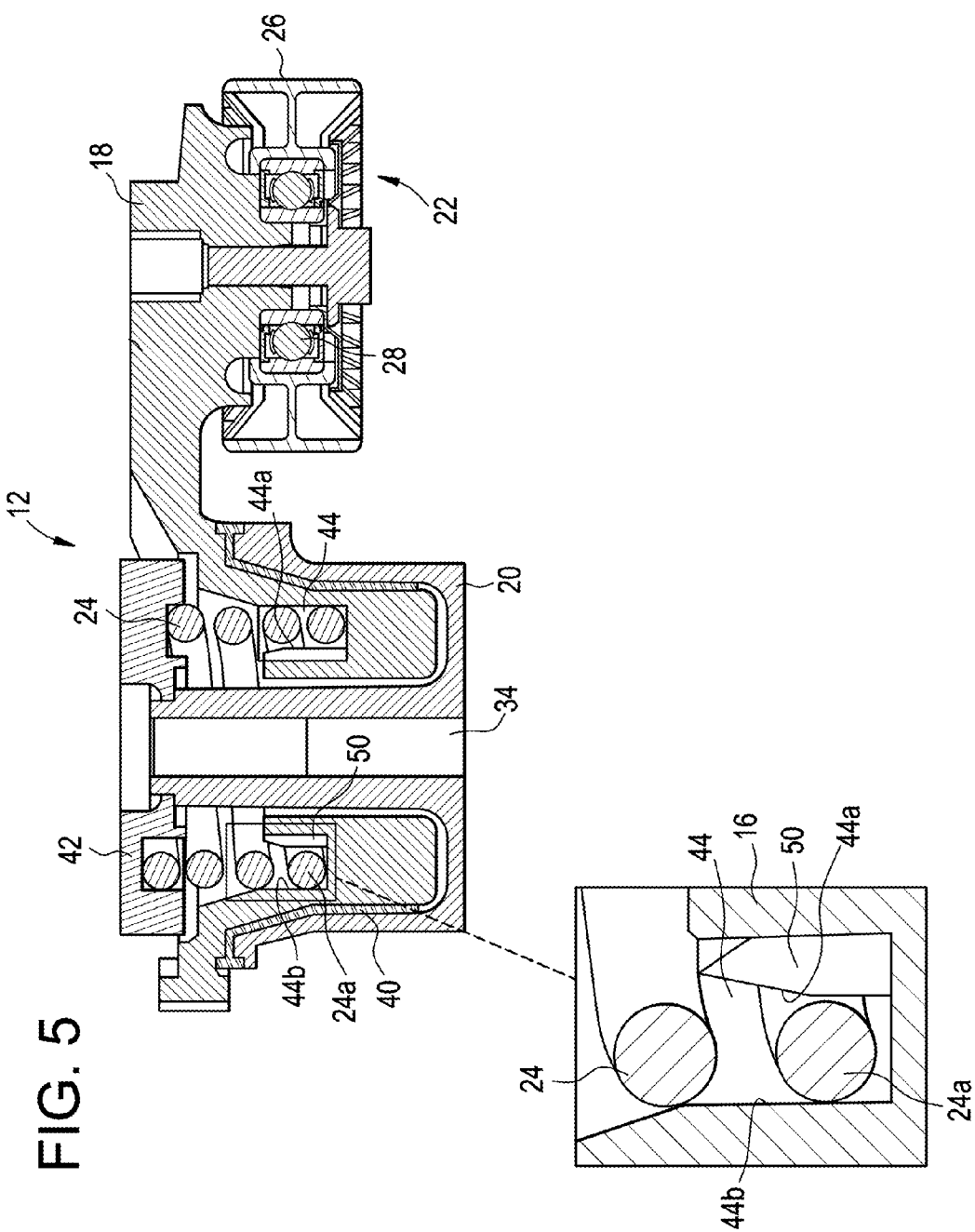
FIG. 5 illustrates the tensioner of FIG. 3 in its install position.

As shown in FIG. 5, when the tensioner 12 is moved to its install position, the spring 24 is unwound even further, increasing its diameter until the bottom axial end 24a of the coil 24 frictionally engages, and forms an interference fit/engagement with the outer surface 44b of the spring cavity 44. Thus, the bottom axial coils 24a, or parts thereof, of the spring 24 are again deactivated thereby increasing the spring factor. Thus, coils of the spring 24, or parts thereof, switch between an activated state and deactivated state based upon a position of the arm 18 relative to the base 20.

As the tensioner 12 moves between the free arm, nominal, and install position, various coils of the spring 24, or parts thereof, become activated and/or deactivated. Moreover, due to the tapered surfaces of the inner 44a and/or outer 44b surfaces, more coils, or portions thereof, will become progressively engaged/disengaged as the tensioner 12 moves from the free arm position to the nominal position, and from the nominal position to the install position (and vice versa). In one case, it may be assumed that the diameter of the spring 24, and therefore the spring factor k, changes linearly with respect to the position of the arm 18, although this relationship can be varied. In one embodiment, the spring rate changes at least about 1 percent, or at least about 5 percent, or, in another embodiment, at least about 10 percent for each degree of travel of the arm 18.

Figure 6:
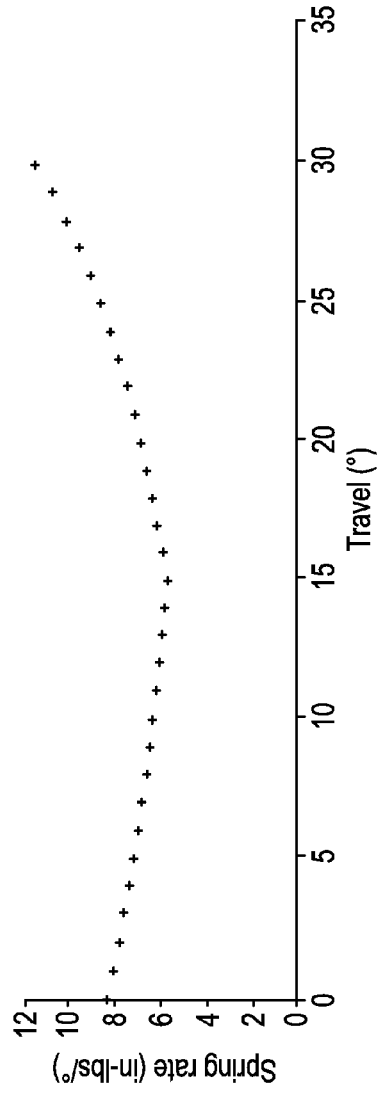
FIG. 6 is a graph showing a spring rate vs. arm position.

FIG. 6 illustrates one embodiment showing the spring rate k of the spring 24 as a function of the position of the arm 18. It can be seen that the spring rate k has its minimum value when the tensioner 12 is at the nominal position (15 degrees of travel in the illustrated embodiment) and progressively increases to relative maximum values at the free arm (0 degrees) and install (30 degrees) positions. In one case, the spring 24 has four coils, and in the nominal position, all four coils are activated. In this illustrative case about 1.33 coils are deactivated when the tensioner 12 is in the free arm position, and about two coils are deactivated when the tensioner 12 is in the install position. However, the number of coils activated/deactivated any particular position can also be varied as desired.

Figure 7:
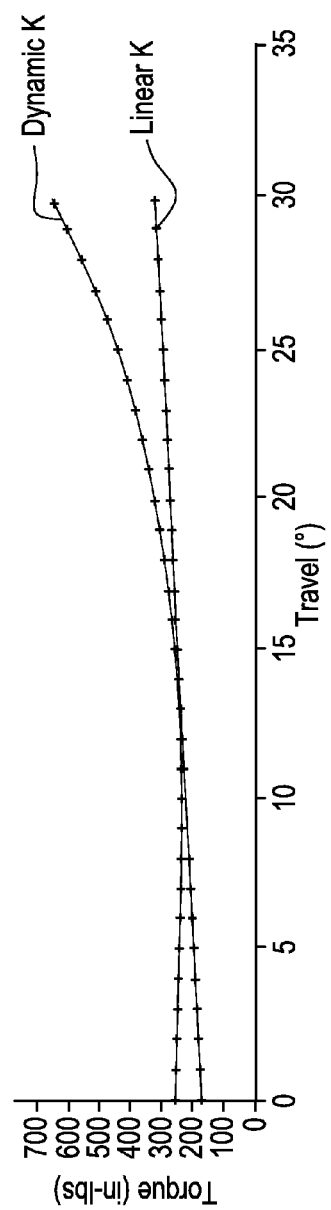
FIG. 7 is a graph showing torque vs. travel for the system utilizing the spring rate of FIG. 6, as compared to a standard linear-based system.

FIG. 7 illustrates a graph showing torque vs. travel for a tensioner 12 having the spring rate characteristics shown in FIG. 6 (i.e. the upper curve labelled "Dynamic K"). In this case it can be seen that torque is generally flat/constant when the tensioner 12 moves from the free arm position to the nominal position, and may change less than about 5%, or less than about 10%, in one case. The torque then increases as the tensioner 12 is moved past the nominal position to the install position.

The flat torque curve from the free arm position to the nominal position provides certain benefits. In particular, as noted above, over time the belt 14 or other components may stretch or wear, and the tensioner 12 may move more toward the free arm position. In this case, then, even as the tensioner 12 moves more toward the free arm position, torque remains constant. In contrast, in many existing conventional systems, as the tensioner 12 moves more toward the free arm position, torque would decrease. Thus, under many existing systems, the torque of the tensioner 12 at the nominal position would have to be set at an elevated level, above MRT, to accommodate loss of torque over time. Accordingly, the present system allows torque at the nominal position to be set at a relatively low level (such as the MRT level), which reduces loads on the bearings, reduces belt friction, improves fuel efficiency, increases belt life, bearing life and decreases the packaging size of the tensioner 12.

Figure 8:
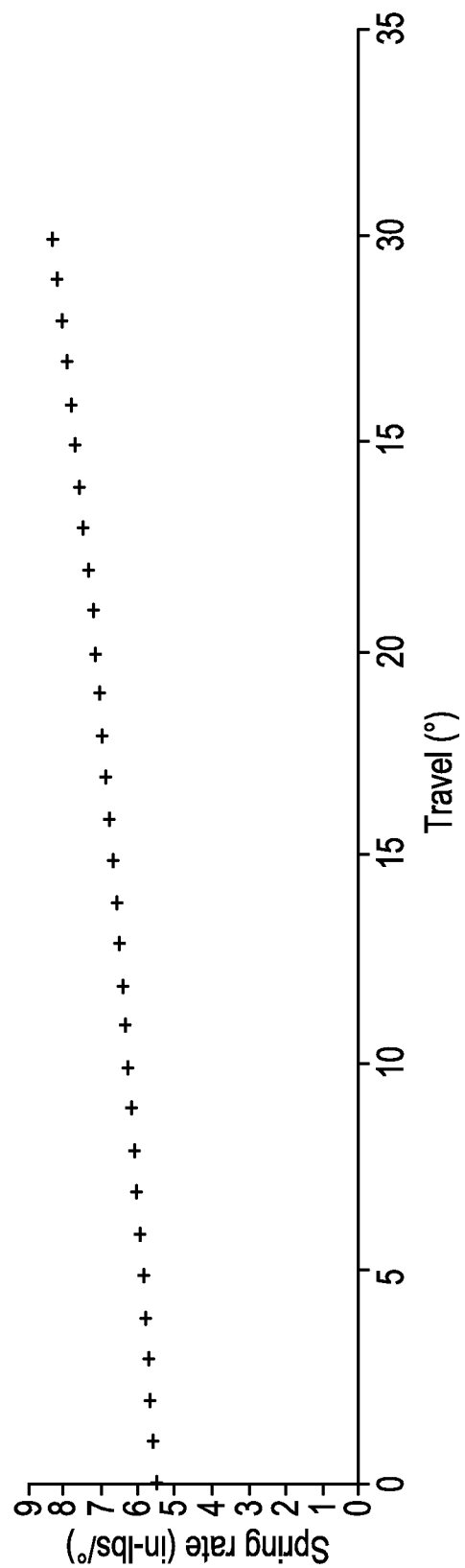
FIGS. 8-13 are various additional graphs showing spring rate and torque vs. arm position.
Figure 9:
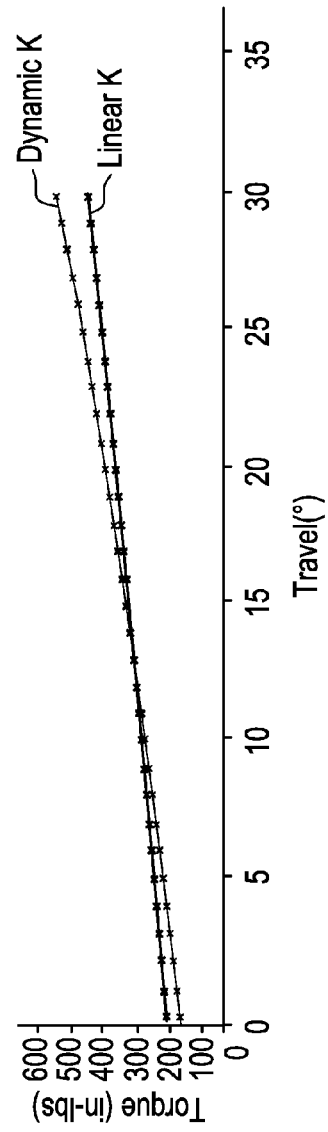
Figure 10:
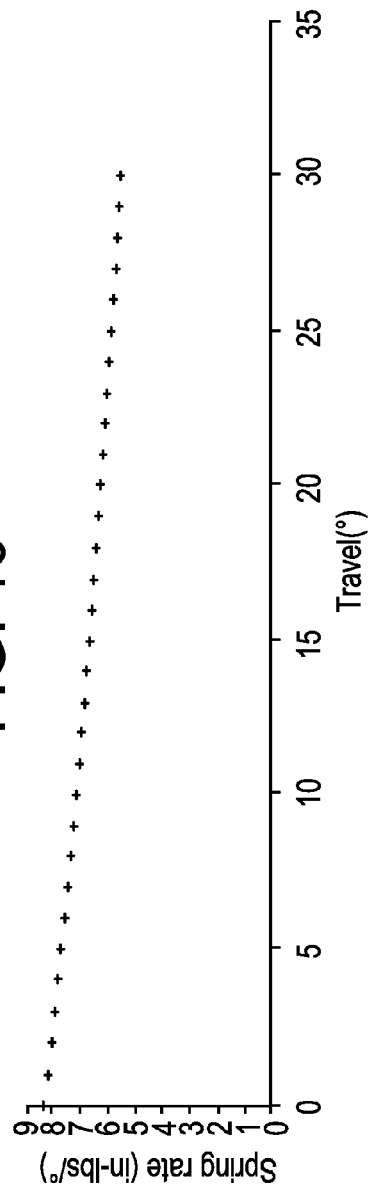
Figure 11:
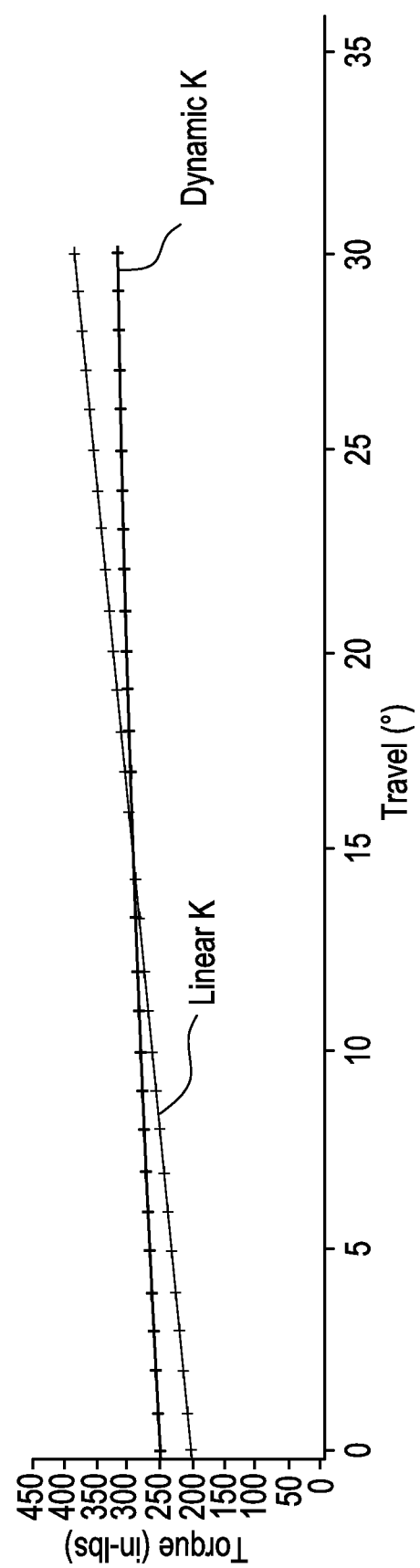

In the embodiment shown in FIGS. 3-7, the spring rate k increases if the tensioner 12 is moved out of the nominal position either pivoting direction thereof. However, if desired, the tensioner 12 may be configured such that the spring factor k increases in only one direction for part or the entire range of the arm 18. For example, in one case the spring factor k increases (e.g. linearly in one case) with increasing degrees of travel, as shown in FIGS. 8 and 9. This is accomplished by progressively deactivating more coils with increasing travel of the arm 18 throughout its entire range of motion from the free arm position to the install position. The tensioner 12 may also be configured such that the spring factor k decreases (e.g. linearly) with increasing degrees of travel, as shown in FIGS. 10 and 11 This is accomplished by progressively activating more coils with increasing travel of the arm 18.

Figure 12:
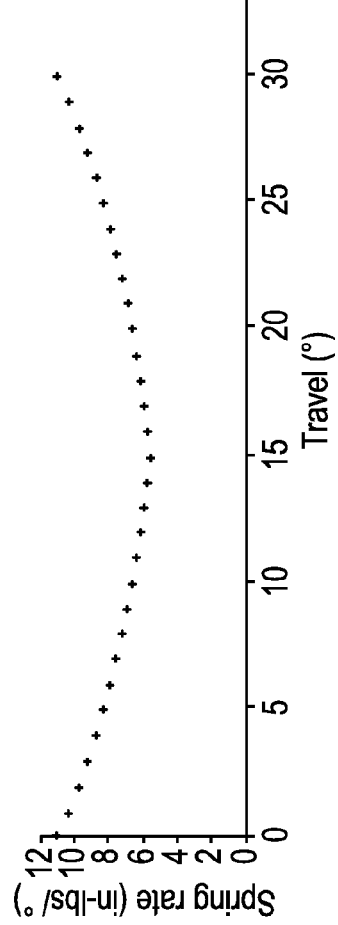
Figure 13:
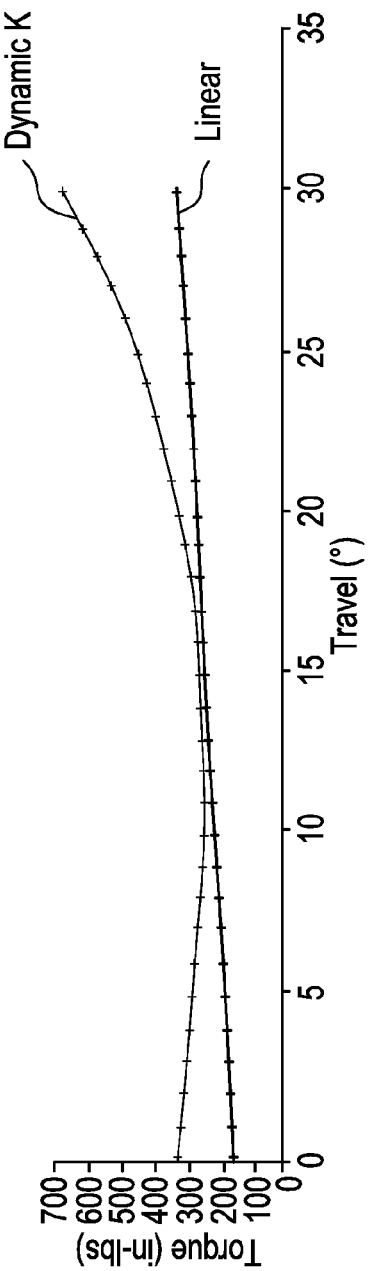

The tensioner 12 may be configured such that the spring rate has a minimum value at the nominal position, but increases at a rate greater than linear, which causes the torque curve to have a minimum at the nominal position, as shown in FIGS. 12 and 13. In order to produce a more dramatic change in torsional spring rate throughout the travel of the arm 18, as shown in FIGS. 12 and 13, the spring 24 may be modified such that more coils are deactivated during travel of the arm 18. In order for more coils to be deactivated, the spring 24 needs to provide more active coils at the nominal position. However, the more active coils used or utilized at the nominal position, the less the mean diameter of the spring 24 changes throughout the travel of the arm 18, thereby requiring tighter tolerances.

In the system described and shown herein the diameter of the spring 24 increases when the spring 24 moves from the free arm position to the nominal position, and from the nominal position to the install position. However, the configuration may be reversed such that the diameter of the spring 24 decreases when the spring moves from the free arm position to the nominal position, and from the nominal position to the install position. The spring 24 may be configured such that the spring 24 winds (rather than unwinds) when the arm 18 moves in the direction of arrow 38 of FIG. 1, and/or may be configured such that winding of the arm 18 (rather than unwinding) induces an additional spring force.

In the illustrated embodiment, none of the coils are deactivated (i.e., all of the coils are active) when the tensioner 12 is in the nominal position. However, it is possible that some of the coils may remain deactivated even when the tension 12 is in the nominal position. In one case, however, a minimum number of coils may be deactivated when the tensioner 12 is in the nominal position as compared to other positions.

Since the inner 44a and outer 44b surfaces control the deactivation of coils as a function of position, it may be important to provide precise shape, positioning and angle/contour to the inner and outer surfaces. Thus, in the embodiment shown in FIGS. 2-5, an insert 50 is positioned in the spring cavity 44 and forms/defines the inner surface 44a thereof. In this manner, the insert 50 can be machined to precise tolerances for ease of manufacturing. The insert 50 can be made of various materials, such as steel, to accommodate relatively high hoop stresses applied by the spring 24. Similarly if desired an insert (not shown) may be inserted in the spring cavity 44 to form/define the outer surface 44b of the spring cavity 44. However, the insert(s) 50 are optional, and if desired the radially inner and/or outer walls of the arm 18 defining the spring cavity 44 can be shaped (i.e. during a casting process) to provide the desired activation/deactivation characteristics to the spring 24/tensioner 12.

Thus, the expanding/contracting spring 24, used in combination with angled or tapered inner 44a and outer 44b surfaces, provides a simple easy-to-implement system utilizing only a single spring, wherein the spring factor varies with respect to the position of the arm 18. The design is relatively simple, inexpensive and easily assembled. The system thereby reduces belt friction, reduces belt wear, and can be configured to be directionally correct to improve fuel efficiency.

Having described the invention in detail and by reference to certain embodiments, it will be apparent that modifications and variations thereof are possible without departing from the scope of the invention.

What is claimed is:

1. A tensioning system comprising:
    a base;
    an arm pivotally coupled to said base, said arm having an engagement surface thereon; and
    a biasing mechanism operatively coupled to said arm to bias said arm relative to said base, wherein said biasing mechanism includes a coil spring having a plurality of coils, at least some of said coils or parts thereof being configured to switch between an activated state and deactivated state based upon a position of said arm relative to said base;
    wherein said deactivated state is a state in which said coil or part thereof does not act as a spring or biasing device and wherein said activated state is a state in which said coil or part thereof acts as a spring or biasing device.

2. The system of claim 1 wherein said biasing mechanism is movable to a position wherein all of said coils are in an activated state.

3. The system of claim 1 wherein said biasing mechanism is movable to a position wherein some of said coils or parts thereof are in an activated state and others of said coils or parts thereof are in a deactivated state.

4. The system of claim 1 wherein said biasing mechanism is configured to assume a nominal position wherein said arm engages and induces tension in a power transmitting element, and wherein said biasing mechanism is configured to provide an increased spring rate when said arm is moved away from said nominal position.

5. The system of claim 4 wherein said biasing mechanism is configured to provide an increased spring rate when said arm is moved away from said nominal position in either pivotal direction.

6. The system of claim 4 wherein all of said coils are in an activated state when said arm is in said nominal position.

7. The system of claim 4 wherein said arm is biased to a free arm position in the absence of any outside forces, and wherein said biasing mechanism applies the same torque to said arm when said arm is in said nominal position as when said arm is in said free arm position.

8. The system of claim 4 wherein said arm is biased to a free arm position in the absence of any outside forces, and wherein said spring has a lower spring rate when said arm is in said nominal position compared to when said arm is in said free arm position.

9. The system of claim 4 wherein said arm is movable to an install position in which said biasing mechanism applies a stronger torque to said arm than when said arm is in said nominal position, and wherein said spring rate is of said biasing mechanism is greater when said arm is in said install position than when said arm is in said nominal position.

10. The system of claim 1 wherein a coil or part thereof becomes deactivated when said coil or part thereof frictionally engages an adjacent component.

11. The system of claim 1 wherein said biasing device is configured such that a spring rate of said biasing mechanism increases as more coils or parts thereof are deactivated.

12. The system of claim 1 wherein said coil spring is positioned inside a spring cavity having an inner surface and an outer surface, and wherein said spring is configured such that sufficient pivoting of said arm relative to said base in a first direction causes coils or parts thereof to engage said inner surface to thereby become deactivated, and sufficient pivoting of said arm relative to said base in a second direction opposite to said first direction causes coils or parts thereof to engage said outer surface to thereby become deactivated.

13. The system of claim 12 wherein said inner and outer surfaces are both angled with respect to a center axis of said biasing mechanism.

14. The system of claim 12 wherein movement of said arm relative to said base in said first direction causes a diameter of said coil spring to decrease, and wherein movement of said arm relative to said base in said second direction causes said diameter of said coil spring to increase.

15. The system of claim 12 wherein said coil spring is generally cylindrical and said spring cavity is generally annular.

16. The system of claim 12 wherein at least one of said inner or outer surfaces is defined by an insert positioned in said spring cavity.

17. The system of claim 1 wherein said biasing mechanism is a helical coil spring configured such that said biasing mechanism unwinds when said arm is pivoted relative to said base in a first direction, and configured such that said biasing mechanism winds when said arm is pivoted relative to said base in a second direction opposite to said first direction.

18. The system of claim 1 wherein said biasing mechanism is configured such that at least some of said coils or parts thereof switch from an activated to a deactivated state, or from a deactivated state to an activated state, only when said arm is pivoted relative to said base in a first direction.

19. The system of claim 1 wherein said switching between said activated state and said deactivated state based upon said position of said arm relative to said base causes said biasing mechanism to have a variable spring rate.

20. The system of claim 1 further comprising a power transmitting element in the form of an endless loop, and wherein said engagement surface engages said power transmitting element as biased by said biasing mechanism to apply force to said power transmitting element and induce tension therein.

21. A tensioning system comprising:
a base;
an arm pivotally coupled to said base, said arm having an engagement surface thereon; and
a biasing mechanism operatively coupled to said arm to bias said arm relative to said base, wherein said biasing mechanism including a coil spring having a plurality of coils, wherein said coil spring is positioned inside a spring cavity having an inner surface and an outer surface, and wherein said spring is configured such that sufficient pivoting of said arm relative to said base in a first direction causes coils or parts thereof to engage said inner surface to thereby be in a state in which said coils or parts thereof do not act as a spring or biasing device, and sufficient pivoting of said arm relative to said base in a second direction opposite to said first direction causes coils or parts thereof to engage said outer surface to thereby be in a state in which said coils or parts thereof do not act as a spring or biasing device.

* * * * *